(12) United States Patent
Glucksman

(10) Patent No.: US 6,314,237 B1
(45) Date of Patent: Nov. 6, 2001

(54) VAPOR GENERATOR

(75) Inventor: Dov Z. Glucksman, Wenham, MA (US)

(73) Assignee: Appliance Development Corporation, Danvers, MA (US)

(*) Notice: Subject to any disclaimer, the term of this patent is extended or adjusted under 35 U.S.C. 154(b) by 0 days.

(21) Appl. No.: 09/571,231

(22) Filed: May 16, 2000

(51) Int. Cl.⁷ .......................... A61H 33/12; D06F 75/00; F17C 7/04
(52) U.S. Cl. ............................ 392/405; 219/433
(58) Field of Search ................... 261/130, 142; 219/433, 287, 276; 392/381, 405, 406

(56) References Cited

U.S. PATENT DOCUMENTS

| | | | |
|---|---|---|---|
| 4,818,344 | 4/1989 | Glucksman | 202/176 |
| 5,111,529 | 5/1992 | Glucksman | 392/405 |
| 5,835,680 | 11/1998 | Glucksman et al. | 392/501 |

Primary Examiner—Teresa Walberg
Assistant Examiner—L. Fastovsky
(74) Attorney, Agent, or Firm—George A. Herbster

(57) ABSTRACT

An immersible heater module for elevating the temperature of a liquid in a container. The heating module has a semi-spherical shape and is formed with an outer body that inhibits the adherence of residues during the boiling process, such as stainless steel or dielectric-coated stainless steel, and an aluminum inner body. Electrical heating coils are affixed to the aluminum body to heat the aluminum body and transfer heat through the outer body into the liquid. The composite of the inner and outer bodies provides efficient heat transfer for boiling liquid.

23 Claims, 7 Drawing Sheets

VAPOR GENERATOR

BACKGROUND OF THE INVENTION

1. Field of the Invention

This invention generally relates to immersion heaters and more specifically to immersion heaters for converting liquids into gas as, for example, by generating steam from water for use in a wide variety of applications.

2. Description of Related Art

Humidifiers, distilling apparatus, water kettles and coffee brewing machines are some devices that use immersion heaters to heat a liquid or to convert a liquid, such as water, into vapor or steam by boiling water. In humidifiers steam mixes with air and disperses throughout a room to increase relative humidity. In a distilling apparatus a condenser receives the steam to produce distilled water. In water kettles the immersion heaters boil or heat cold water to a desired temperature. In many coffee makers, immersion heaters boil water to enable the water to percolate through coffee grounds to produce hot coffee.

Many embodiments immersion heater types exist. However, characteristically over time deposits or residues from the water adhere to the surface of such immersion heaters. These deposits form an insulating layer that impedes the transfer of heat to the water thereby reducing the effectiveness of the immersion heater. Cleaning of these deposits or residues becomes very difficult.

U.S. Pat. No. 5,111,529 (1992) to Glucksman, that is assigned to the same assignee as this invention, discloses one embodiment of an immersion heater used with a portable air humidifier. A housing contains an evaporation chamber in the shape of an inverted cup. The chamber has a steam outlet in its top and an electric heating element positioned a short distance above an open bottom. In this particular humidifier a blower delivers cool air through a duct to communicate with the evaporation chamber through its steam outlet to blow humidified air back into the room. Water from a main compartment or tank transfers to a compartment in a removable tray that allows ready access to the compartments for cleaning.

U.S. Pat. No. 4,818,344 (1989) to Glucksman, that is assigned to the same assignee as this invention, discloses a water distilling apparatus with a vaporization chamber containing an electric coil heating element, a fin tube condenser coil and an electric fan for cooling the surfaces of the condenser coils. An electric coil heating element vaporizes water and the resulting steam travels through the condenser tubing where it reconverts to pure water for delivery to a beaker through a water outlet. It is possible to remove various portions of this device for cleaning sediments and residues.

U.S. Pat. No. 5,835,680 (1998) to Glucksman et al., that is assigned to the same assignee as this invention, discloses an immersible heater with an annular collar that spaces a heating element above a bottom wall of the structure. The collar acts as an insulator thereby to limit the heat transferred to the bottom wall that is typically formed of a plastic material. In addition, a thermostat monitors the temperature of the heater. When the water is nearly evaporated, the thermostat or a backup thermofuse turns off the heater. This occurs while water still surrounds at least the collar and therefore prevents damage from overheating.

In another humidifier sold by Slant Fin, a stainless steel cup holds water to be boiled. A heating coil attaches to the exterior of the cup and heats the water in the cup to the boiling point. It is easier to clean the interior of this cup as compared to prior cups. However, like the other devices described above, during cleaning it is necessary to handle an entire base unit. However, such base units generally contain electrical components. Such base units generally can not be immersed in water or be cleaned in a dishwasher.

Each of the foregoing patents discloses a heating element that, like other heating elements of the prior art, becomes difficult to clean. As known, water available through various municipal and other supplies contains minerals that do not evaporate along with the water. Certain of these minerals, especially lime, adhere to the heat transfer area, namely to the outer surface of the heating element. As this residue accumulates, the heat transfer rate to the water decreases with two adverse effects. First, the process by which the boiling occurs becomes less efficient. Secondly, the heating coils will operate at a higher temperature. Moreover, as also known, the residue becomes more difficult to remove as it accumulates over time. Although a stainless steel cup reduces any cleaning effort, a requirement to carry an entire humidifier base to a sink for cleaning remains.

SUMMARY

Therefore it is an object of this invention to provide an immersion heater that is easy to clean.

Another object of this invention is to provide an immersion heater that inhibits the permanent build-up of residue coatings during operation while maintaining an efficient transfer of heat to liquid being boiled.

Still another object of this invention is to provide a steam generator with a heating element that is easy to clean.

Yet another object of this invention is to provide a heating module for boiling water that is inexpensive to manufacture and that is simple to clean.

In accordance with one aspect of this invention, an immersion heater for elevating the temperature of a liquid has a first body having a cavity formed therein and an exterior surface. A second body overlies the first body. An electrical heating element has a portion disposed in the cavity.

In accordance with another aspect of this invention, a steam generator converts water into steam and comprises a container for water. A heating module for immersion in the water includes an aluminum semispherical body defining a cavity and a stainless steel body having a first, semispherical portion overlying the aluminum body. Extensions of the first portion form an annular flange spaced from the aluminum body. A seal lies intermediate the flange and the container. An electrical heater is attached to the aluminum in the cavity. Electrical connectors provide a connection to an electrical source.

In accordance with another aspect of this invention, an immersible heater module converts water in a container into steam. The container has a bottom opening. The heater module includes a base having electrical connections adapted for attachment to a power source and a first body of material selected for its high heat transfer coefficient. The first body is formed with a cavity. A second body of material that resists the adhesion of residue on the material overlies the first body. An electrical heating element attaches to the first body in the cavity. A sealing structure produces a water-tight seal between the heating module and the container. Portions of the heating element extend exteriorly from the cavity and connect to electrical connections in the base.

BRIEF DESCRIPTION OF THE DRAWINGS

The appended claims particularly point out and distinctly claim the subject matter of this invention. The various objects, advantages and novel features of this invention will be more fully apparent from a reading of the following detailed description in conjunction with the accompanying drawings in which like reference numerals refer to like parts, and in which:

DESCRIPTION OF THE DRAWINGS

Figure 1:
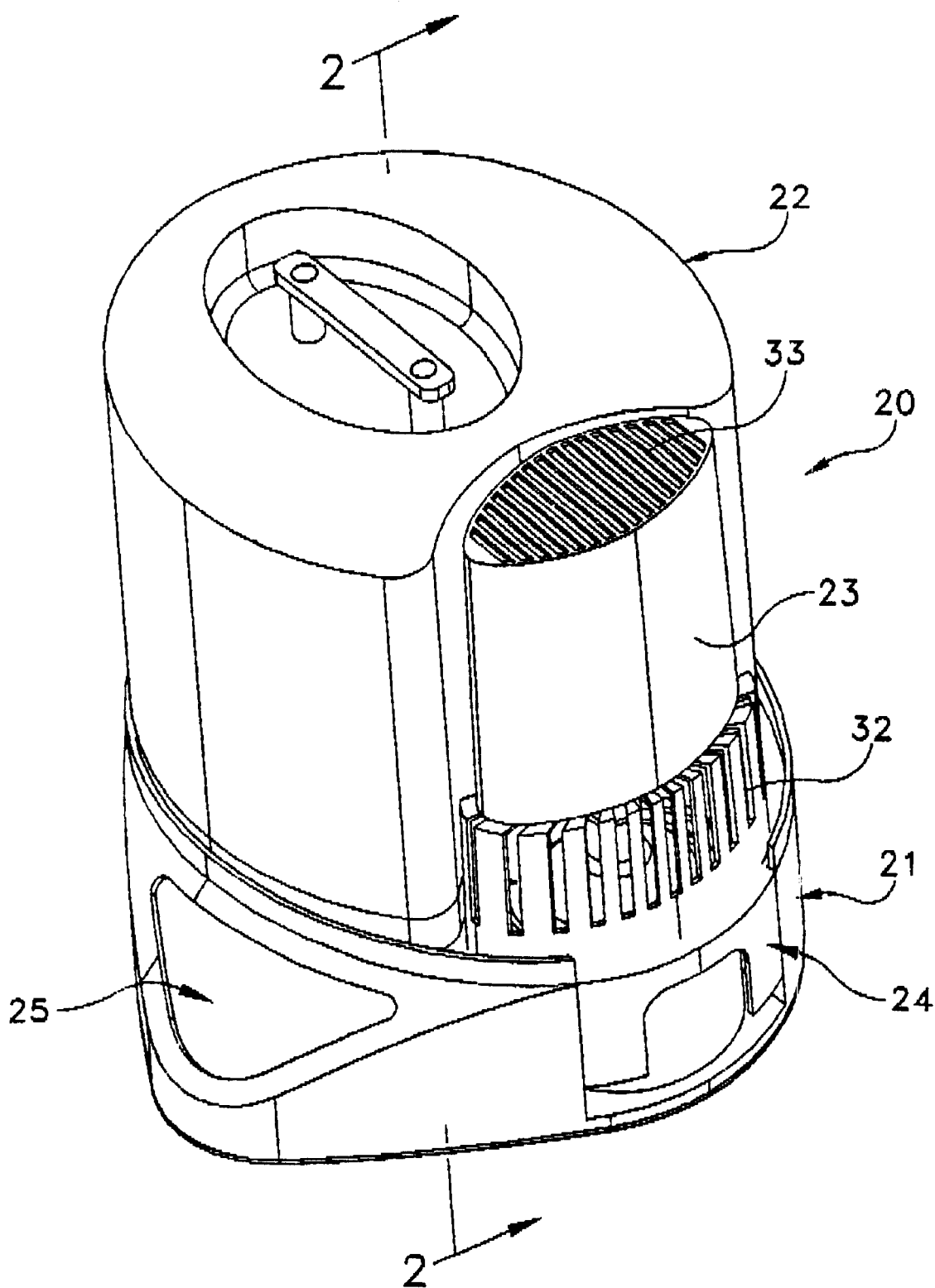
FIG. 1 is a perspective view of warm mist humidifier that incorporates this invention.

An immersion heater or vapor generator constructed in accordance with this invention can be best understood in the context of a particular device, such as a steam generator for use in a warm mist humidifier 20 shown in FIG. 1. This particular warm mist humidifier includes a base unit 21, a water tank 22, a mixing stack 23 and a removable steam generator assembly 24. A control panel 25 includes an on/off switch, operating lights and other components (not shown) as necessary.

Figure 2:
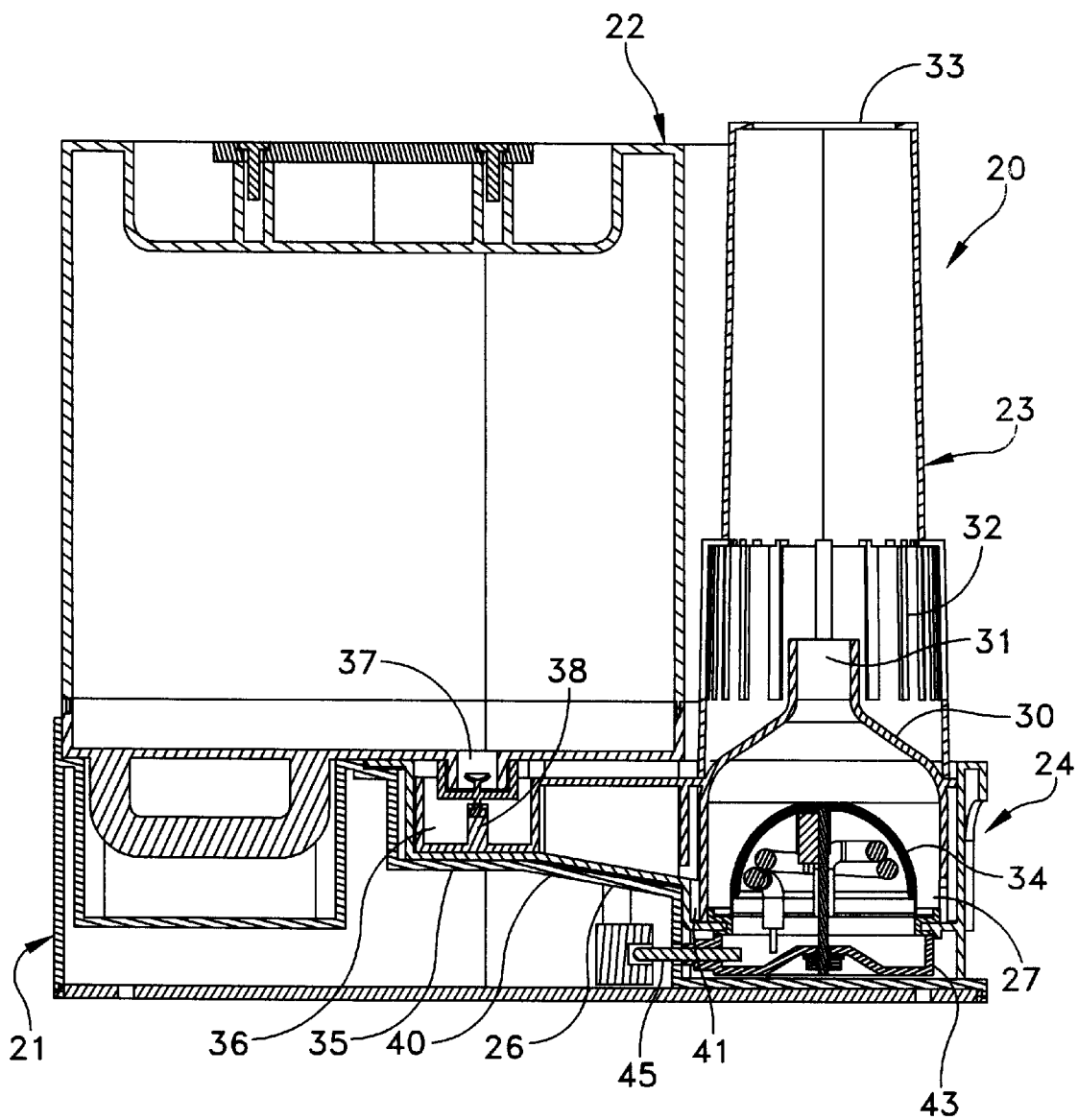
FIG. 2 is a cross-section view of the humidifier shown in FIG. 1.

Referring to FIGS. 1 and 2, the removable steam generator assembly 24 includes a steam generator 26 that contains water collected in a boiling chamber 27 located within the confines of a generally cylindrically shaped steam dome or chimney 30 that also supports the mixing stack 23. As shown most clearly in FIG. 2, the steam dome or chimney 30 is removable and can be formed of a number of materials including a talc-filled polypropylene. The chimney 30 additionally includes an outlet 31 with a funnel shape that allows the steam to form a high velocity jet. As the jet moves vertically upward in FIG. 2, it provides an area of reduced pressure allowing room air to enter the mixing stack 23 through air intake openings 32. The mixed air and steam then exit through openings 33 at the top of the mixing stack 23.

Figure 3:
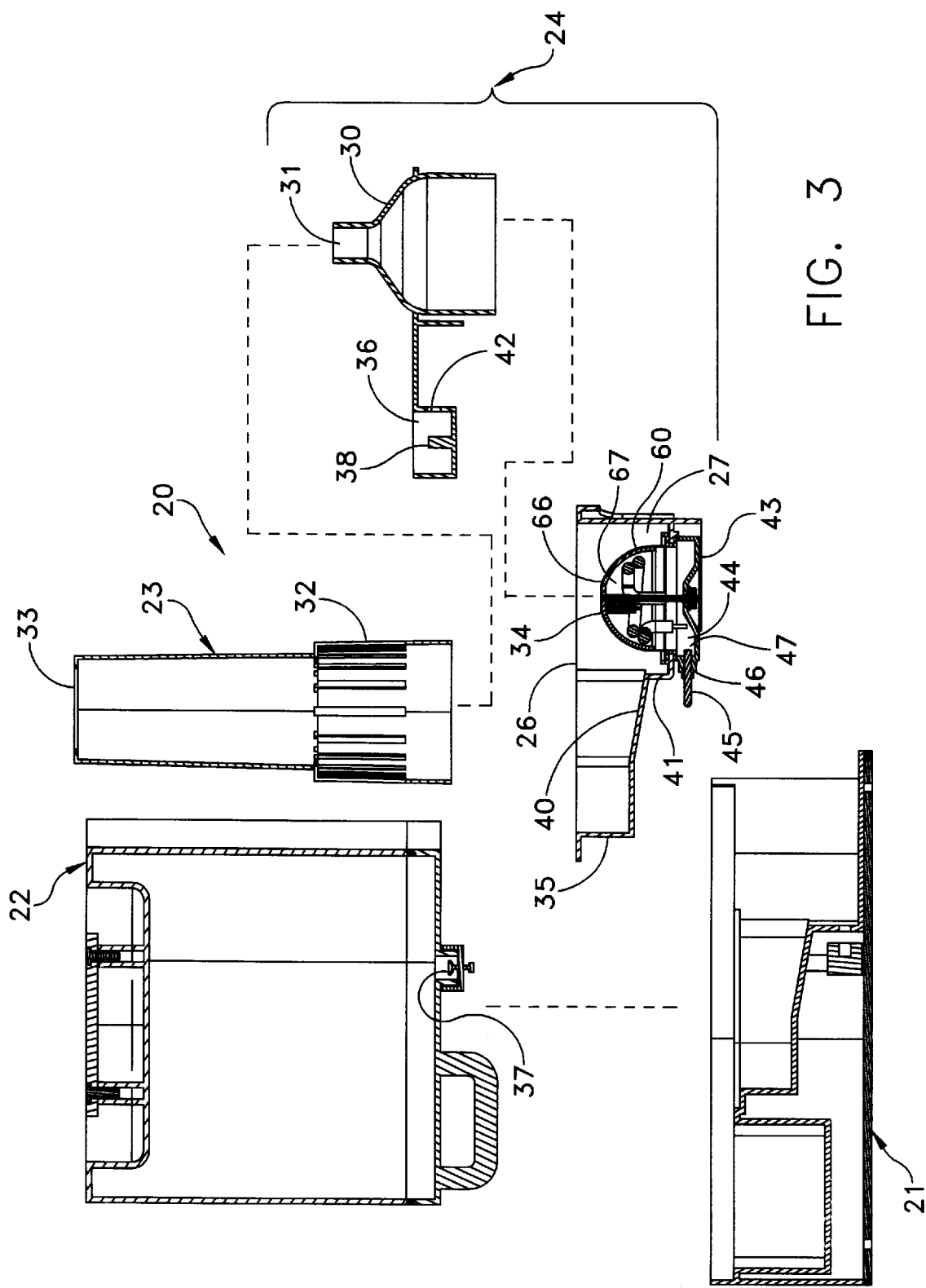
FIG. 3 is an exploded view of the components of the humidifier shown in FIG. 2.

FIG. 3 depicts the warm mist humidifier 20 as it can be disassembled for cleaning. First the water tank 22 can be readily removed from the base unit 21. After the mixing stack 23 is removed, the removable steam generator assembly 24 can be slid from the base unit 21, to the right in FIG. 2, along support rails that are not shown. However, the construction of such support rails is well known in the art. Then the steam dome 30 can be lifted from the removable steam generator assembly 24. The remaining portion constitutes the steam generator 26 with an immersible heater module 34.

The steam generator 26 includes an open container 35 that receives water from the water tank 22. That is, when the humidifier 20 is assembled, water flows down a sloped surface 40 in the container 35 into a reservoir 41 and then into the boiling chamber 27. As shown more clearly in FIG. 2, the steam dome 30 carries a well 36 that is positioned under a conventional release valve 37 formed in the bottom of the water tank 22. When the well 36 is in place, a central pedestal 38 elevates the valve 37 and allows water to transfer through a base passage 42 in the well 36 and onto the slope 40. Otherwise the valve 37 prevents water from leaving the water tank 22.

As can be seen in FIG. 3 and described in more detail later, the heating module 34 provides a substantially semi-spherical surface within the boiling chamber 27. As known, the boiling process begins when a small bubble of steam is formed at a heated surface or wall. As more heat flows into the area, the bubble grows as more water evaporates. When the heat bubble attains a size where its buoyancy overcomes the adhesion force between it and the surface of the heater, the bubble detaches from the heated surface and floats rapidly to the top of the water surface and rises into the atmosphere as water vapor or steam. However, as the steam bubble is being formed and grows, the heat transfer rate at that position diminishes because the heat transfer coefficient into gas is less than into liquid. Thus while the steam bubble is attached to the heat transfer surface, the surface temperature rises since heat is not being carried away. With a flat horizontal heating surface, bubbles grow to a fairly large size before they detach themselves from the heating surface. Consequently the heating surface runs at a higher average temperature during a boiling process. This limits the amount of heat that can be generated on a per unit area. Heating along a vertical surface, however, is more effective in terms of the ability to generate high heat flux because the bubbles more easily detach themselves from the vertical heating surface.

Experiments have led to the conclusion that a semispherical shape is an optimal shape because the surface area is maximized in relationship to the volume of the heating element. Yet the steam bubbles still easily separate from a spherical surface with an efficiency to be expected from a vertical surface.

Figure 4:
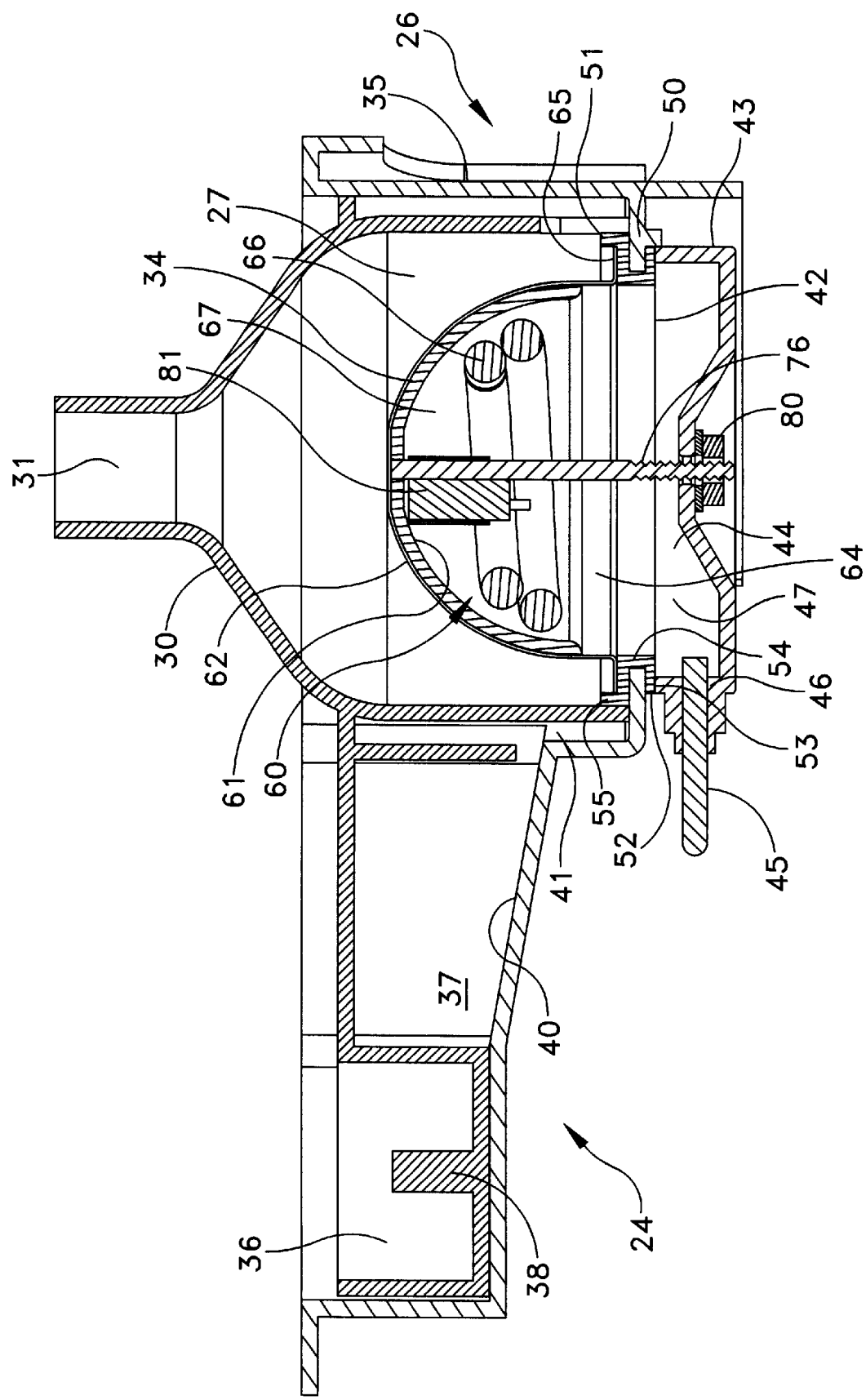
FIG. 4 is a cross-sectional view of a removable steam generator for use in the humidifier of FIG. 1.
Figure 5:
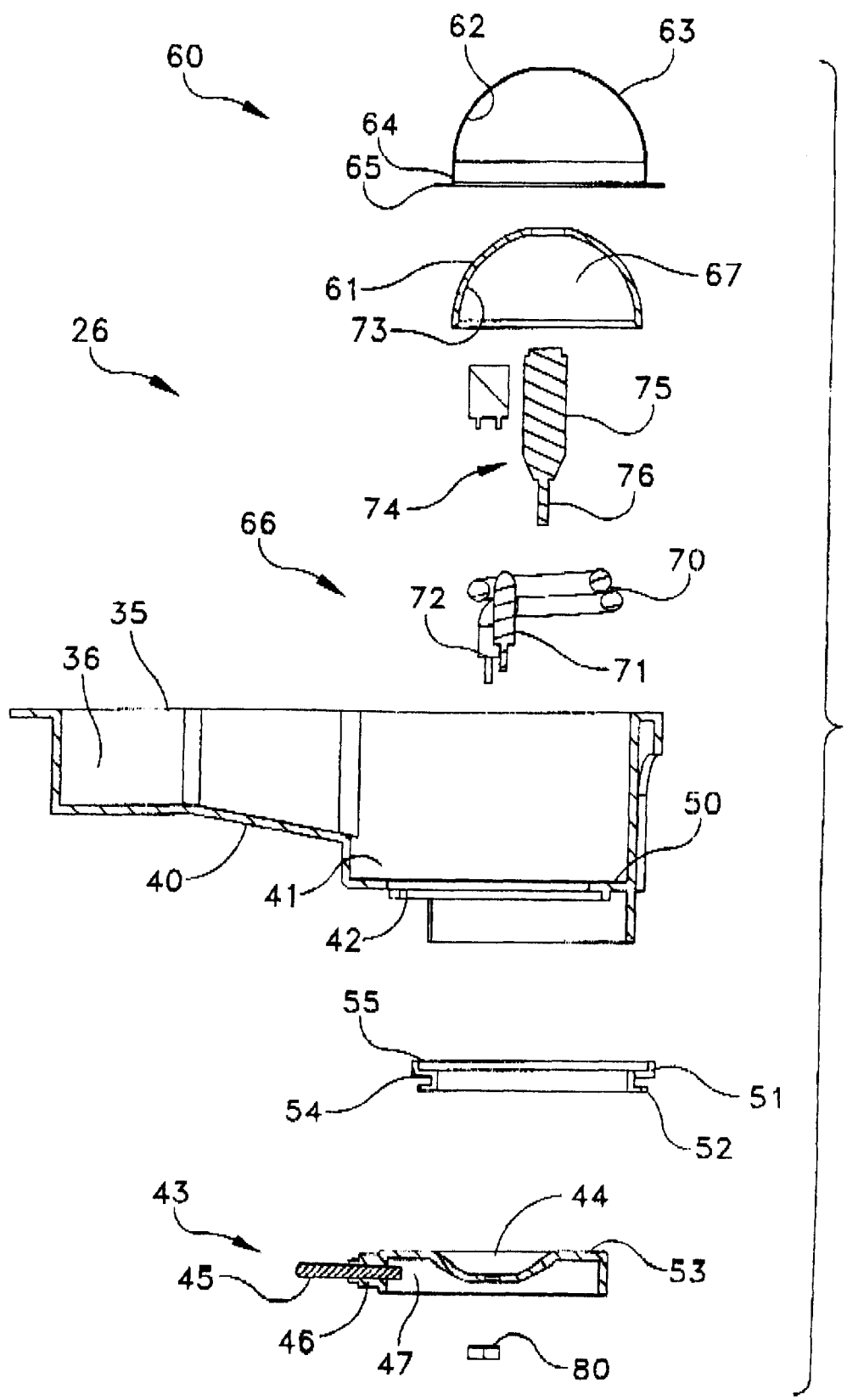
FIG. 5 is an exploded view of the removable steam generator constructed in accordance with this invention.
Figure 6:
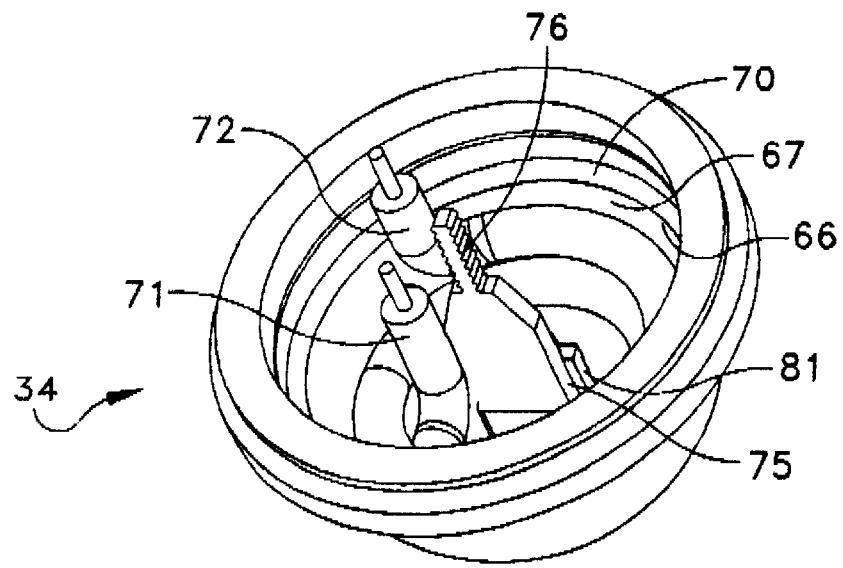
FIG. 6 is a perspective view taken from the bottom of a heating module used in the removable steam generator.
Figure 7:
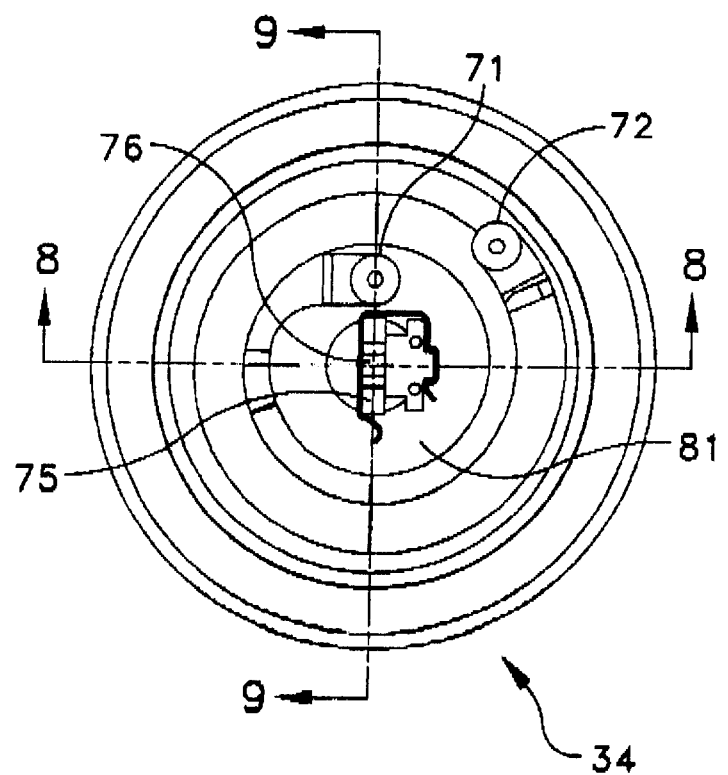
FIG. 7 is a bottom plan view of the heating module shown in FIG. 6.

Referring now to FIGS. 4 and 5, the open container 35 has a bottom opening 42. The heating module 34 spans that opening and includes an optional lower base cover 43 that defines a cavity 44 to provide a mechanically protected area for electrical connectors. Some applications of an immersible heater module constructed in accordance with this invention may incorporate other styles of base covers or may omit a base cover altogether. In this embodiment a male plug 45 extends through a wall 46 of the base cover 43 and terminates with an internal connector 47 within the cavity 44. The cavity 44 serves as a site for any electrical connections that need to be made to other portions of the heating module 34.

An inwardly extending lip 50 defines the opening 42. A conventional seal 51 engages the lip 50 and seals the heating module 34 to the container 35 at the bottom opening 42. More specifically, the seal 51 has a bottom leg 52 that lies on a bottom surface of the lip 50 and that is interposed between an upper edge 53 of the base cover 43 and the lip 50. An intermediate leg 54 lies along a top surface of the lip 50 and an upper end 55 completes the seal 51.

The heart of the heating module 34 is a heating element 60 with a first body 61 and a second overlying body 62. The first body is relatively thick in a radial direction. It is formed from the group of materials having a high heat transfer coefficient. Deep drawn aluminum, for example, produces a very satisfactory first body 61. The body 61 has a cup shape or essentially semispherical form. The second body 62 has a first portion 63 that overlies and is coextensive with the first body 61. The material of the second body 62 is taken from a group of materials that inhibit the permanent adherence of residue to their surfaces. Typically these materials have a heat transfer coefficient that is less than the coefficient that characterizes the first body 61.

As will become apparent later, this characteristic is used to advantage in the construction of the heating element 60 and steam generator 36. In the preferred embodiment, the second body 62 comprises a drawn, thin stainless steel body. The overlying portion 63 intimately contacts the outer surface of the first body 61; typically the two bodies are brazed together. In addition, the second body has a skirt extension 64 that spaces the first body 61 from other components of the steam generator 36.

Some electrical codes may require double insulation of electrical devices of the type that includes the vapor generator of this invention. The specific structure of the second body 62 is readily adapted to meet such requirements. It is merely necessary to assure that all the exposed portions of the second body 62 have a coating of a dielectric material that inhibits the permanent adherence of residue to the coated second body 62. Teflon is an example of a readily available coating material. Coating stainless steel, rather than some other material, is still desirable in order to maintain the support and thermal insulating functions of the skirt 64.

Figure 8:
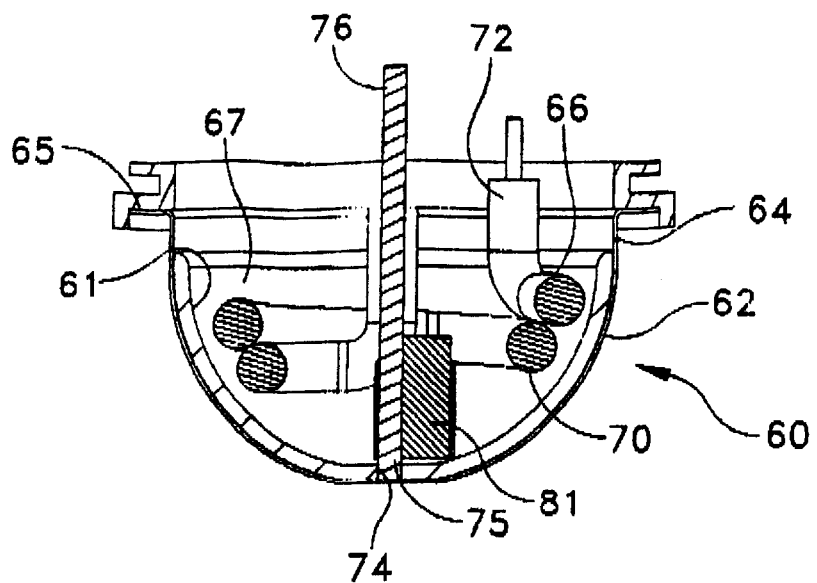
FIG. 8 is a cross-sectional view taken along lines 8—8 in FIG. 7.
Figure 9:
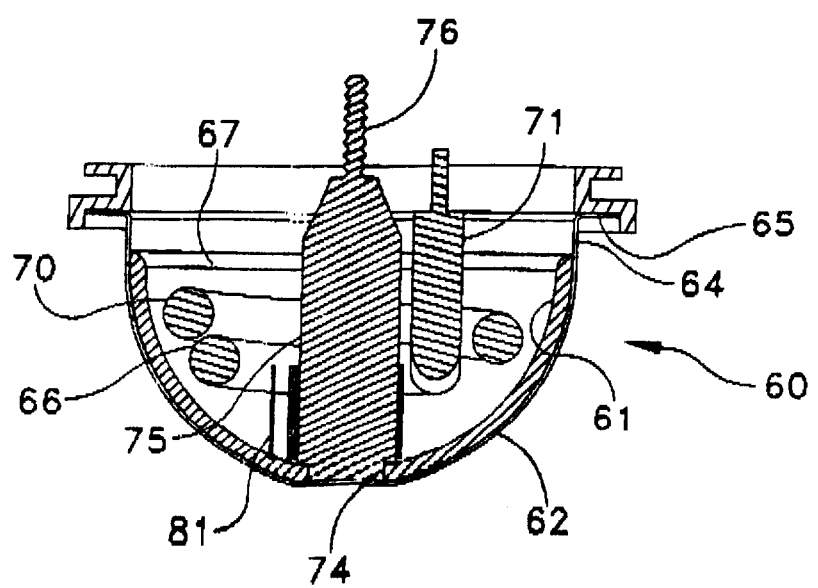
FIG. 9 is a cross-sectional view taken along lines 9—9 in FIG. 7.

Referring particularly to FIG. 4 and FIGS. 8 and 9 that depict the heating module 34 in an inverted orientation, the skirt portion 64 of the second body 62 spaces the first body 61 from the seal 51, the lip 50 and the base cover 43. This configuration provides an advantage primarily because the second body 62 is very thin. As the first body 61 heats, heat transfers radially from the first body 61 through the second body 62 to water in an efficient manner because the heat transfer path is transversely through the thin radial dimension of the body 62. This path has a large cross sectional area and short length. However, the heat transfer path to the seal 51 includes only the skirt 64. The cross-sectional area for this path is very small because the skirt 64 is thin. This path is also relatively long. Consequently, this path through the skirt 64 minimizes any heat transfer to the flange 65 and the surrounding seal 51 thereby thermally isolating the heating element 60 from other plastic structures, so they remain cool during normal operations.

As will now be evident, this structure further facilitates cleaning. First, the container 35 and heating module 34 are readily accessible from the top as shown in FIG. 3 for cleaning any residue from the container walls and surfaces or from the surface of the heating module 34. Any residue will accumulate on the outer surface of the second body 62. However, residues do not adhere strongly to the surfaces of stainless steel or other similar materials, so the surface is easily scrubbed. Typically the steam generator 26 with its container 35 and heating module 34 can be cleaned in a dishwasher. In more severe cases, vinegar or other decalcifying solutions might be placed in the container 35 before cleaning. As will be evident, it is not necessary to carry the entire base unit 21 to a sink for cleaning.

The heating module 34 also has a heating element 66 in a cavity 67 formed in the first body 61. In this particular embodiment the heating element 66 has a sheathed two-turn heating element coil 70; such heating elements are known in the art. End terminations 71 and 72 are formed to be substantially parallel to each other and to a vertical axis in FIG. 5. The two-turn coil 70 attaches to the interior surface of the first body 61 toward the base thereof as is particularly shown in FIGS. 3 and 6 through 9. Brazing is a preferred method of attachment. This assures good heat transfer path from the coil 70 to the first body 61.

As shown in FIGS. 5, 6, 8 and 9, the interior surface of the first body 61 near its top portion includes an anchor 74 for receiving a plate 75 that extends axially and terminates in a threaded axial extension 76. The threaded extension 76 extends downwardly beyond the cavity 67. The flange 65 is captured between the intermediate and top legs 54 and 55 of the seal 51. Thus as particularly shown in FIG. 4, when the heating module 34 is mounted, the threaded extension 76 passes into the cavity 44 defined by the base cover 43. A nut 80 tightens onto the threaded extension 76 and clamps the heating element 60 and base cover 43 together and to the inwardly extending lips 50. Consequently the seal 51 isolates the cavity 47 and electrical connections from any liquid in the reservoir 41 of the container 35.

In addition, the terminal extensions 70 and 71 extend downwardly into the cavity 44 so that connections between the terminations 70 and 71 and the male plugs, such as the male plug 45, can be made in the cavity 44 in isolation from any liquid in the container 35.

The plate 75 also carries a thermostat 81 and may carry a thermofuse (not shown, but known in the art). The thermostat 81 is, as shown particularly in FIGS. 4, 8 and 9, located near the top of the first body 61. This becomes a device that senses a low water condition. When water is being boiled, sufficient heat is being withdrawn from the aluminum body 61 so that its temperature remains below a predetermined level. However, when the water falls below a certain level, the heat does not radiate into the air so efficiently. Consequently the temperature of the first body 61 rises. The thermostat 81 senses this temperature rise and, directly or indirectly, interrupts any current to the heating coil 70.

Therefore in accordance with the various objects of this invention, there has been disclosed a steam generator that, by virtue of the shape of its heating module, is very efficient. The composite nature of the first and second bodies 61 and 62 facilitates cleaning. Further the removable steam generator assembly 24 provides easy access to its various surfaces. Moreover, the stainless steel outer surface on which any residue would accumulate is easily scrubbed. In addition, the geometry of the heating module 34, and especially the skirt 64, reduces thermal requirements for plastic materials thereby reducing manufacturing costs.

This invention has been disclosed in terms of a single embodiment. It will be apparent that various modifications could be made to this invention. Other materials having the characteristics of stainless steel and aluminum might be substituted for each of those materials. Alternate embodiments of relationships between heat generating elements such as the two-turn coil 70 and the heat transferring structures formed by the first and second bodies 61 and 62 could also be provided. The particular structure of the steam generator 26 would be modified for other applications. Therefore, it is the intent of the appended claims to cover all such variations and modifications as come within the true spirit and scope of this invention.

What is claimed as new and desired to be secured by Letters Patent of the United States is:

1. An immersion heater for elevating the temperature of a liquid comprising:
   A) a first body of a first material having a cavity formed therein and an exterior surface,
   B) a second body for contacting the liquid, said second body being in overlying contact with said first body, and C) an electrical heating element having a portion disposed in said activity.

2. An immersion heater as recited in claim 1 wherein said first body is formed with a material selected for its ability to conduct heat and said second body is formed with a material selected for its ability to resist permanent adherence of deposits from the liquid.

3. An immersion heater as recited in claim 1 wherein said first body comprises aluminum and said second body comprises stainless steel.

4. An immersion heater as recited in claim 1 wherein said second body comprises a stainless steel body coated with a dielectric material.

5. An immersion heater as recited in claim 3 adapted for use with a container wherein said second body additionally contains a portion that extends beyond said first body to form a skirt that attaches to the container to space said first body from the container.

6. An immersion heater as recited in claim 5 wherein said heating element comprises a coiled resistance heating unit attached to said first body in said cavity.

7. An immersion heater as recited in claim 6 additionally including extensions of said resistance heating unit that extend past said skirt.

8. An immersion heater as recited in claim 3 additionally comprising temperature sensing means located in said cavity and in contact with said first body.

9. An immersion heater as recited in claim 3 additionally comprising a mounting bolt that is formed integrally with said first body and that extends from said cavity.

10. An immersion heater as recited in claim 3 wherein said first body and the coextensive portions of said second body have a semispherical shape.

11. A steam generator for converting water into steam comprising:
   A) a container for the water, and
   B) a heating module for immersion in the water, said heating module including:
      i) a first, aluminum, semispherical body defining a cavity,
      ii) a second body comprising stainless steel having a first, semispherical portion overlying said first body and extensions of said first portion forming an annular flange spaced from said aluminum body,
      iii) a seal that is intermediate container and said flange from water in said container,
      iv) an electrical heater attached to said first body in said cavity, and
      v) electrical connectors for connecting said heating module to an electrical source.

12. A steam generator as recited in claim 11 wherein said first body is formed about an axis and has a radial thickness than is greater than the radial thickness of said second body.

13. A steam generator as recited in claims 12 wherein said second body is formed of stainless steel with a dielectric coating.

14. A steam generator as recited in claim 12 additionally comprising a base cover wherein said heating module additionally includes an axially extending post attached to said first body, said post including means for securing said base cover to said heating module.

15. A steam generator as recited in claim 14 wherein said post carries a thermostat connected electrically in series with said heating element thereby to control the energization of said heating element in response to the temperature of said aluminum body.

16. A steam generator as recited in claim 15 wherein said heating element comprises a multiple turn portion of an electrical resistance heater and end portions that extend substantially axially past said seal for attachment to said electrical connectors.

17. A steam generator as recited in claim 12 additionally comprising a steam director that is positioned over said heating module in said container for directing the steam in a predetermined direction, said steam director being removably mounted in said container.

18. A steam generator as recited in claim 17 for use in a device including a device housing, said container and the device having complementary structures for enabling said heater module to be removed from the device housing.

19. A steam generator as recited in claim 15 additionally comprising an auxiliary heater juxtaposed to said thermostat that is energized when said thermostat deenergizes said heating element thereby to prevent said thermostat from reenergizing said heating element.

20. An immersible heater module for converting water in a container into steam wherein the container has a bottom opening, said heater module comprising:
   A) a base having electrical connections adapted for attachment to a power source,
   B) a heating module including:
      i) a first body of a material selected for its heat transfer coefficient, said first body having a cavity,
      ii) a second body of a material in overlying contact with said first body selected for its ability to resist the adhesion of deposits on the material, and
      iii) an electrical heating element attached to said first body in said cavity and adapted for connection to said electrical connections,
   C) a sealing structure for producing a water-tight seal between said heating module and the container, portions of said heating element extending exteriorly from said cavity and being connected to said electrical connections in said base whereby water at said second body converts to steam when said heating module is energized by the power source.

21. A heater module as recited in claim 20 wherein said first and second bodies are formed of aluminum and stainless steel respectively.

22. A heater module as recited in claim 20 wherein said first and second bodies are formed of aluminum and of a dielectric-coated stainless steel, respectively.

23. A heater module as recited in claim 21 wherein the thickness of said first body is greater than the thickness of said second body.

* * * * *